United States Patent

Resendez, Sr.

[11] Patent Number: 6,045,221
[45] Date of Patent: Apr. 4, 2000

[54] EYEGLASSES CLIP

[76] Inventor: Julio Resendez, Sr., 6600 McCoy St., Watauga, Tex. 76148

[21] Appl. No.: 09/313,318

[22] Filed: May 17, 1999

[51] Int. Cl.[7] ........................................ G02C 5/14
[52] U.S. Cl. ............................................. 351/112
[58] Field of Search ............................. 351/112, 51, 158, 351/155

[56] References Cited

U.S. PATENT DOCUMENTS

| D. 379,364 | 5/1997 | Totsuka et al. | D16/321 |
|---|---|---|---|
| 1,779,015 | 10/1930 | Schmitt | 351/112 |
| 1,898,059 | 2/1933 | McDonald | 351/112 |
| 4,316,654 | 2/1982 | Allen | 351/155 |
| 4,496,224 | 1/1985 | Allen | 351/155 |
| 4,575,204 | 3/1986 | Heide et al. | 351/155 |
| 5,471,258 | 11/1995 | Hsieh | 351/123 |
| 5,653,414 | 8/1997 | Chimel | 248/316.7 |

FOREIGN PATENT DOCUMENTS

| 421 551 | 3/1967 | Switzerland | 351/112 |

*Primary Examiner*—Huy Mai
*Attorney, Agent, or Firm*—Edward L. White

[57] ABSTRACT

The present invention incorporates a spectacle clip for attaching eye glasses to a user's garments. The present invention overcomes disadvantages of prior art devices by improving the aesthetic and functional characteristics of the clip. The clip can be either attached in an integral fashion to the side piece of a pair of eye glasses at the factory, or attached in an after-market fashion. The clip can also be provided as part of kit, which includes all of the necessary tools and equipment necessary to attach the clip to a pair of glasses.

1 Claim, 2 Drawing Sheets

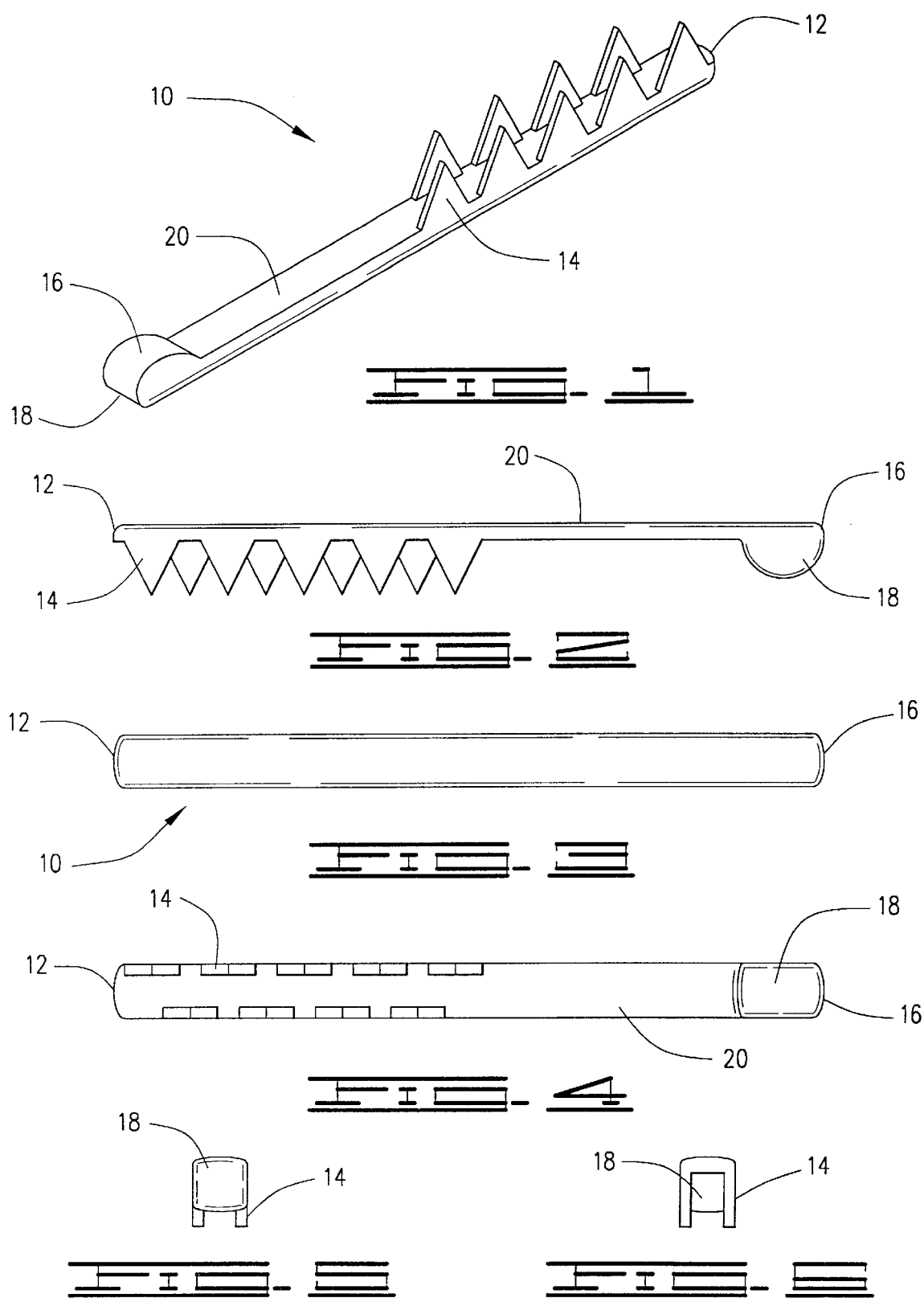

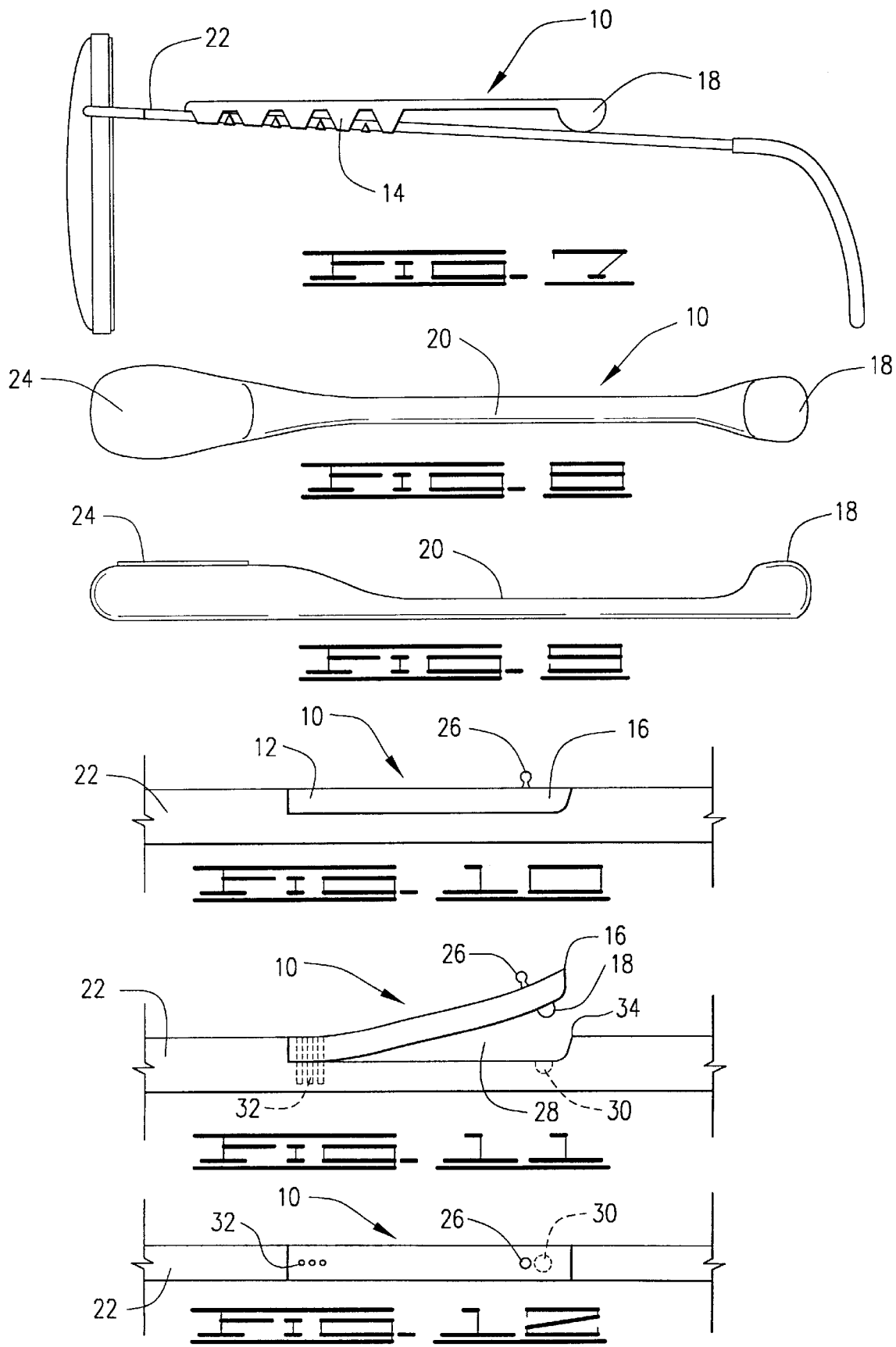

EYEGLASSES CLIP

CROSS REFERENCES TO RELATED APPLICATIONS

None.

BACKGROUND OF THE INVENTION a. Field of the Invention

The invention relates to eye glasses and accessories therefor. More particularly, the invention relates to devices intended to secure spectacles, eye glasses, and the like in releasable attachment to one or more articles of a wearer's clothing when they are not in use to correct the user's vision.

b. Description of the Prior Art

If those wearing glasses always kept them on their face, there would be no need for the present invention. However, wearers of eye glasses take off their glasses for many reasons. The reasons include the fact that many people require reading glasses. Reading glasses are not useful when these type of wearers are looking at medium or long distance objects. In fact, such reading glasses detract from a wearers' vision when viewing objects and medium or long distances.

When an eye glass wearer takes off their glasses, it is common to lay them down somewhere.

If there is no convenient place to lay them, a wearer will often try to stick them in a pocket or the like. The glasses tend to fall out of the pocket and break or get stepped on. Therefore, there is a need for a device to secure eye glasses to the clothing of a wearer.

U.S. Pat. Nos. 4,316,654 and 4,496,224, both to Allen, disclose different types of an eye glass frame with a pocket clip. Both of the devices disclosed by Allen use a component which is adjacent to the lens itself as a clip member for attaching the eye glasses to a wearer's clothing.

More typically, clips are or have been attached to the temple pieces or side pieces of eye glasses. Then, when the eye glasses are slid into the wearer's pocket, the clip attached to the temple piece slides over a portion of the clothing and clips onto the clothing by pressing it against the temple piece. These types of clips are well known. Unfortunately, for some reason, eye glass manufacturers have failed to provide these clips as a standard part of eye glasses typically sold to consumers.

SUMMARY OF THE INVENTION

In view of the foregoing disadvantages inherent in the known types of eye glasses and the accessories therefor, it is an object of the invention to provide an apparatus which overcomes the various disadvantages of the prior art.

In particular, it is an object of the invention to provide clips which can be added to eye glasses after they are purchased by a consumer. It is a further object of the present invention to provide a kit including all of the necessary elements to attach such clips to eye glasses. The kit includes elements which allow the clips to be attached to either wire frame or plastic frame glasses. Different methods are required for each type of attachment to make a suitable connection.

It is a further object of the present invention to provide a more aesthetically pleasing, and at the same time efficient, clip. The present invention provides for protection against snagging or catching the clip in a user's hair when the eye glasses are being worn by the user.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

The invention will be better understood and the objects other than those set forth above will become apparent when consideration is given to the following detailed description thereof. Such description makes reference to the annexed drawings wherein:

FIG. 1 is a perspective view of the first embodiment of the present invention.

FIG. 2 is a side view of the first embodiment of the present invention.

FIG. 3 is a top view of the first embodiment of the present invention.

FIG. 4 is a bottom view of the first embodiment of the present invention.

FIG. 5 is a front view of the first embodiment of the present invention.

FIG. 6 is a back view of the first embodiment of the present invention.

FIG. 7 is a top view of the first embodiment in use on the side piece of the pair of eye glasses.

FIG. 8 is a bottom view of the second embodiment of the present invention.

FIG. 9 is a side view of the second embodiment of the present invention.

FIG. 10 is top view of a third embodiment of the present invention.

FIG. 11 is the same top view of the third embodiment with the clip pulled away from the side piece of the pair of eye glasses.

FIG. 12 is a side view of the third embodiment of the present invention.

DETAILED DESCRIPTION OF PREFERRED EMBODIMENTS

Referring now to the drawings, where like numerals represent like or parts, an apparatus 10 incorporating the principles of the present invention is generally illustrated in the figures. Three embodiments of the present invention are shown in the FIGS.: first, an embodiment designed to be added to a pair of eye glasses after it is purchased, the clip 10 using bendable attachment teeth 14 to hold itself to the eye glasses side piece 22; a second embodiment having thereon flat surfaces, including attachment pad 24 which is used to either apply epoxy or other glue-like material to stick the clip to the side piece 22 or two-sided sticky tape or the like used in a similar manner; a third embodiment in which the clip 10 is incorporated into the side piece 22 for a more aesthetically pleasing appearance. Certainly there are other embodiments of the present invention which are easily understandable and identifiable given the three embodiments described herein. The first two embodiments are intended to be used in an "after market" fashion where the clips are attached to a pair eye glasses which have been purchased without a clip. The third embodiment is intended to be incorporated in eye glasses during the production process. The first two embodiments may be sold as a kit incorporating various elements required to mount and improve the appearance of the clip on pair of eye glasses. The third embodiment is sold as an integral part of the eye glasses as they are purchased. Manufacturers could provide to eye glass retailers ear pieces with and without the clip 10 incorporated. That way, a customer could select either a pair of glasses with a clip integral therein, and could further decide whether they want the clip on the left or right ear piece or both.

The clip could be manufactured from a variety of materials. The two most fundamental characteristics of the materials of construction are that the material be substantially rigid, yet flexible enough to deform slightly. Once deformed, the material must return to its original shape. Suitable materials include steel, aluminum, copper, titanium, and other metals and alloys thereof. Also, plastics, resins, rubber, and other carbon-based materials could be appropriate materials for the formation of the clip 10. Composite materials may also be suitable, incorporating carbon fibers, fiberglass, and the like. Under some circumstances, wood may be a suitable material, depending on the style of the eye glass frame and the application. Materials of construction are not critical to the operation of the invention. Rather, the materials of construction should compliment and be consistent with the materials of construction for the eye glasses so that the appearance of the eye glasses is not harmed by the addition of the clip 10.

The clip may be sold in a variety of colors. If the clips are sold as part of a kit, the kit may include coloring materials to stain or paint the clip to match the eye glass frame to which it is attached.

The three embodiments illustrate three means of attaching the clip 10 to the side piece 22. The first embodiment illustrates the bendable metal teeth 14 used to bend around the side piece 22. As shown, the teeth 14 have substantially pointed ends. Under certain circumstances, this may present a problem with the device grabbing or trapping a user's hair. In other circumstances, it may be desirable to use teeth 14 with a rounded edges. Where a device with bendable metal teeth 14 is used, it may be desirable to solder the teeth together or to solder the teeth onto a metal frame to which it is attached. Soldering is probably not an option if the teeth are bent around a plastic side piece 22. Where the teeth 14 are bent around the plastic side piece 22, it may be desirable to use a glue or epoxy to bond the teeth to the side piece 22. In addition, if an appropriate epoxy or resin is used, it can be used to fill the gaps between the teeth preventing the grabbing or snagging of the user's hair by the teeth, and also potentially, if colored epoxy or resin is used, matching the teeth to the color of the eye glass frames to which they are attached.

In embodiment two, an attachment pad 24 is provided. The attachment pad 24 may either be coated with glue or epoxy, and stuck to the eye glass frame to which the clip 10 is to be attached, or may have a double sided tape material attached to it. The clip would come with a peel off backing, which once removed would expose the sticky side. The clip 10 could then be stuck to the side piece 22.

The third embodiment illustrates a type of spectacle clip 10 which is incorporated in the side piece 22 at the eye glass manufacturing facility. As shown, the spectacle clip 10 fits into a receiving slot 28 defined in the side piece 22. A grip means 26 is provided on the outside of the spectacle clip 10 so that a user can grasp that to pull the spectacle clip 10 away from the side piece 22, inserting the garment or other material to be grabbed between the spectacle clip 10 and the side piece 22. As shown, the spectacle clip 10 incorporates a tip 18 adapted to grabbingly engage clothing or other material to be grabbed between the tip 18 and an edge 34 of the receiving slot 28. As shown, the spectacle clip 10 is attached to the side piece 22 by integral attachment means 32. The tip 18 is received within a tip receiver 30 defined below the receiving slot 28. This tip receiver 30 allows the spectacle clip 10 to remain flush with the side piece 22 when not in use. The integral attachment means 32 can either be a rivet-like device or threaded devices. Where threaded devices, such as screws, are used, the spectacle clip 10 can be removed and replaced if it ever becomes worn or overly deformed. Once removed, it can be bent back into shape or replaced with a new spectacle clip 10.

In general, the spectacle clip 10 is comprised of a first end 12 incorporating the attachment means (such as teeth, glue, or the like) and a second end 16 incorporating a tip 18 adapted to concentrate the gripping force of the clip. Between the two end 12 and 16, is a mid-portion 20. The mid-portion 20 is flexible and resilient such that it is capable of being deformed but springs back into its original, substantially straight configuration once the deforming force is removed.

It would be preferable to have the clip 10 incorporated in the side piece 22 from the factory. In such cases, the third embodiment shown in FIGS. 10 through 12 would be the preferable arrangement for the clip 10. Embodiments one and two, shown in FIGS. 1 through 9, while functional and operational, are less desirable than the third embodiment shown in FIGS. 10 through 12, because the first and second embodiments tend to snag the hair of the user more and detracts more from the appearance of the eye glasses.

Where the clip 10 is not incorporated at the factory, a kit will preferably be provided for users to attach the clips. The kit would include at least one clip, and preferably more than one. If more than one clip is included, it may be desirable to include one of both the first embodiment using attachment teeth, and the second embodiment having the attachment pad 24. Suitable epoxy, resin, or other sticky materials would be provided to attach the clips to a side piece 22. The kits would come with a variety of colors, and styles of clips to match the various colors and styles of eye glasses available. It would also be desirable that the kit would include means for changing the color of the clip if desired. For example, if the clip is a brass color, chemicals could be supplied to "antique" the clip to match an antique brass frame. Alternatively, if the eye glasses are red, red paint or dye could be provided to change the color of the clip to match the eye glasses.

OPERATION OF APPARATUS

The operation will be described with reference to the kit, to be attached to a pair of eye glasses in an after-market fashion. The operation of the clip integral in the side piece 22 from the factory, is simple enough that it requires little explanation.

The first step in applying the clip 10 to a side piece 22 is to determine what nature of attachment means are most suitable. One of the first issues to address is the materials of construction of the side piece 22. For plastic, and other synthetic material frames, gluing or otherwise sticking the clip to the eye glass frame itself may be most advantageous. In that case, the second embodiment having the attachment pad 24 would be preferable. If the attachment pad 24 had a peel off label that would be removed, then the clip would be attached to the side piece 22 at or near the pivot point where the side piece 22 attaches to the lens holding portion of the eye glass frame. Where, however, the frame is made of metal, bendable teeth 14 may be preferable means for attaching the clip. In such a case, the clip is placed adjacent to the side piece 22 at a point where it is desired to be connected. The bendable teeth are then deformed to bend around the side piece 22. Once the teeth are bent around the side piece 22 epoxy, resin, or other suitable adhesive materials can be applied to adhere the teeth 14 securely to the side piece 22. Alternatively, a solder gun and solder can be used to solder the teeth 14 onto the metal.

Once the clip is securely attached to the side piece 22 it is ready to be used. A user simply folds up the eye glasses and sticks them in or on the garment to which the eye glasses are to be attached. The garment to which the clip is to be attached is passed between the side piece and the tip 18 of the clip 10.

Having thus described the field of the invention, the prior, the attached drawings, the summary of the invention, and the detailed description of the preferred embodiments, I claim:

1. A pair of eye glasses having side pieces hinged so that the glasses are allowed to fold up, the improvement comprising:
   a. a spectacle clip attached to one or more of the foldable side pieces, the clip incorporating a grip means to allow said spectacle clip to be pulled away from the side piece, and received within a receiving slot defined in the side piece;
   b. the clip further having a tip at a distal end thereof and a tip receiver defined within the receiving slot for receiving the tip; and
   c. the clip also having integral attachment means for attaching the clip to the side piece.

* * * * *